US012770782B2

(12) United States Patent
Lee et al.

(10) Patent No.: US 12,770,782 B2
(45) Date of Patent: Oct. 20, 2026

(54) METHOD FOR MANUFACTURING MULTIPHASE MAGNET AND MULTIPHASE MAGNET MANUFACTURED THEREBY

(71) Applicant: KOREA INSTITUTE OF MATERIALS SCIENCE, Changwon-si (KR)

(72) Inventors: Jung Goo Lee, Changwon-si (KR); Hee Ryoung Cha, Gimhae-si (KR); Ga Yeong Kim, Busan (KR); Young Kuk Kim, Changwon-si (KR); Youn Kyoung Baek, Changwon-si (KR)

(73) Assignee: KOREA INSTITUTE OF MATERIALS SCIENCE, Changwon-si (KR)

( * ) Notice: Subject to any disclaimer, the term of this patent is extended or adjusted under 35 U.S.C. 154(b) by 823 days.

(21) Appl. No.: 18/013,537

(22) PCT Filed: Aug. 20, 2021

(86) PCT No.: PCT/KR2021/011119

§ 371 (c)(1),
(2) Date: Jun. 29, 2023

(87) PCT Pub. No.: WO2022/039552

PCT Pub. Date: Feb. 24, 2022

(65) Prior Publication Data

US 2023/0326672 A1 Oct. 12, 2023

(30) Foreign Application Priority Data

Aug. 20, 2020 (KR) ........................ 10-2020-0104388
Aug. 20, 2020 (KR) ........................ 10-2020-0104389

(51) Int. Cl.

| | |
|---|---|
| ***B22F 1/08*** | (2022.01) |
| ***B22F 1/00*** | (2022.01) |
| ***B22F 3/14*** | (2006.01) |
| ***B22F 3/17*** | (2006.01) |
| ***B22F 3/18*** | (2006.01) |
| ***B22F 3/20*** | (2006.01) |
| ***B22F 3/24*** | (2006.01) |

(Continued)

(52) U.S. Cl.
CPC ............ *H01F 41/0266* (2013.01); *B22F 1/08* (2022.01); *B22F 1/09* (2022.01); *B22F 3/14* (2013.01);
(Continued)

(58) Field of Classification Search
CPC ........ B22F 1/09; B22F 9/04; B22F 2009/048; H01F 1/0577
See application file for complete search history.

(56) References Cited

U.S. PATENT DOCUMENTS 4,898,625 A * 2/1990 Otsuka .................. H01F 1/0571 419/33
10,192,679 B2 1/2019 Kano et al.
(Continued)

FOREIGN PATENT DOCUMENTS

CN 1035737 A * 9/1989
CN 103545079 A * 1/2014
(Continued)

OTHER PUBLICATIONS

Korean Office Action dated Dec. 19, 2022 for corresponding Korean Patent Application No. 10-2021-0110061, 11 pages.
(Continued)

*Primary Examiner* — Sally A Merkling
*Assistant Examiner* — Sean P. O'Keefe
(74) *Attorney, Agent, or Firm* — Hauptman Ham, LLP

(57) ABSTRACT

The present disclosure provides a method for manufacturing a multi-main-phase structure magnet having excellent coercive force and a multi-main-phase structure magnet manufactured therefrom.

16 Claims, 8 Drawing Sheets

(51) Int. Cl.

| | |
|---|---|
| ***B22F 9/00*** | (2006.01) |
| ***B22F 9/04*** | (2006.01) |
| ***H01F 1/055*** | (2006.01) |
| ***H01F 1/057*** | (2006.01) |
| ***H01F 41/02*** | (2006.01) |

(52) U.S. Cl.

CPC .................. *B22F 3/17* (2013.01); *B22F 3/18* (2013.01); *B22F 3/20* (2013.01); *B22F 3/24* (2013.01); *B22F 9/008* (2013.01); *B22F 9/04* (2013.01); *H01F 1/0551* (2013.01); *H01F 1/0577* (2013.01); *B22F 2003/175* (2013.01); *B22F 2003/185* (2013.01); *B22F 2003/208* (2013.01); *B22F 2003/248* (2013.01); *B22F 2009/048* (2013.01); *B22F 2301/355* (2013.01); *B22F 2998/10* (2013.01); *B22F 2999/00* (2013.01)

(56) References Cited

U.S. PATENT DOCUMENTS

| | | | | |
|---|---|---|---|---|
| 2018/0308633 | A1* | 10/2018 | Ito ...................... | H01F 41/0293 |
| 2019/0006068 | A1 | 1/2019 | Sakuma et al. | |
| 2021/0005380 | A1 | 1/2021 | Kim et al. | |

FOREIGN PATENT DOCUMENTS

| | | | | |
|---|---|---|---|---|
| CN | 102969111 | B | * | 9/2015 |
| JP | 2013-98254 | A | | 5/2013 |
| JP | 2016111136 | A | * | 6/2016 |
| KR | 10-1460912 | B1 | | 11/2014 |
| KR | 10-2015-0033423 | A | | 4/2015 |
| KR | 10-2016-0089485 | A | | 7/2016 |
| KR | 10-2017-0076166 | A | | 7/2017 |
| KR | 10-2019-0003356 | A | | 1/2019 |
| KR | 10-2019-0125770 | A | | 11/2019 |

OTHER PUBLICATIONS

Jiaying Jin et al., "Chemically Inhomogeneous RE-Fe-B Permanent Magnets with High Figure of Merit: Solution to Global Rare Earth Criticality," Scientific Reports, Aug. 24, 2016, 8 pages.

Toyota Motor Corporation, "Toyota Develops New Magnet for Electric Motors Aiming to Reduce Use of Critical Rare-Earth Element by up to 50%," Jan. 2018, 6 pages.

Journal of Korean Powder Metallurgy Institute, vol. 10, No. 1, Dec. 28, 2019, 58 pages; with English abstract; cited in NPL No. 4.

International Search Report issued Dec. 10, 2021, corresponding to International Patent Application No. PCT/KR2021/011119, 6 pages.

* cited by examiner

METHOD FOR MANUFACTURING MULTIPHASE MAGNET AND MULTIPHASE MAGNET MANUFACTURED THEREBY

CROSS-REFERENCE TO RELATED APPLICATIONS

The present application is a national stage filing under 35 U.S.C. § 371 of International Application No. PCT/KR2021/011119 filed on Aug. 20, 2021, which is based upon and claims the benefit of priority to Korean Patent Application No. 10-2020-0104388 filed on Aug. 20, 2020 and Korean Patent Application No. 10-2020-0104389 filed on Aug. 20, 2020, in the Korean Intellectual Property Office. All of the aforementioned applications are hereby incorporated by reference in their entireties.

TECHNICAL FIELD

The present disclosure claims priority to and the benefit of Korean Patent Application No. 10-2020-0104389 filed in the Korean Intellectual Property Office on Aug. 20, 2020, the entire contents of which are incorporated herein by reference.

The present disclosure relates to a method for manufacturing a multi-main-phase structure magnet. Specifically, it relates to a method for manufacturing a multi-main-phase structure magnet having high coercive force, saturation magnetic flux density, and residual magnetic flux density.

BACKGROUND ART

Recently, as research and development of various instruments and devices have been active, the demand for magnets used as parts is increasing explosively. In particular, in the case of Nd—Fe—B magnets, there is a trend that their demand is gradually increasing due to their excellent magnetic properties.

However, in the case of Nd, the earth's reserves thereof as a rare earth metal are very small and, accordingly, the price is very high to cause an increase in the price of magnets. Further, as the demand for Nd magnets increases, it is expected that Nd supply will become more and more difficult in the future. FIG. 1 is a graph showing the output and price of rare earth elements in China. It can be confirmed that the price of Nd, which has a relatively small output, is high.

In order to solve this problem, attempts are increasing to add other rare earth metals, such as La and Ce, which have high output and are inexpensive, instead of Nd. However, when other light rare earth metals other than Nd are added, the magnetic properties of the magnets are very inferior, making it difficult to replace the Nd—Fe—B magnets.

DISCLOSURE

Technical Problem

A technical problem to be solved by the present disclosure is to provide a method for manufacturing a multi-main-phase structure magnet having excellent coercive force.

However, the problem to be solved by the present disclosure is not limited to the above-mentioned problem, and other problems not mentioned herein will be clearly understood by those skilled in the art from the following description.

Technical Solution

According to an aspect of the present disclosure, there is provided a method for manufacturing a multi-main-phase structure magnet, the method comprising steps of: preparing a mixed powder by mixing a first powder having a composition of $Re^1$—Fe—B and a second powder having a composition of $Re^2$—Fe—B; and manufacturing the mixed powder into an anisotropic bulk magnet by performing anisotropic bulking of the mixed powder, wherein the rare earth metals included in $Re^1$ are different from the rare earth metals included in $Re^2$ in one or more of a type and a content of the metals.

According to another aspect of the present disclosure, there is provided a multi-main-phase structure magnet manufactured by the method according to claim 1, the multi-main-phase structure magnet comprising: first phase grains comprising $Re^1$—Fe—B; second phase grains comprising $Re^2$—Fe—B; and a grain boundary phase, wherein the rare earth metals included in $Re^1$ are different from the rare earth metals included in $Re^2$ in one or more of a type and a content of the metals, the first phase grains and the second phase grains have a maximum diameter of 1 μm or less, the grain boundary phase exists at one or more positions of: a space between the first phase grains; a space between the second phase grains; and a space between the first phase grains and the second phase grains, the first phase grains include a first diffusion region formed by diffusion of $Re^2$ in a direction from the outer surface to the center of the first phase grains, and the second phase grains include a second diffusion region formed by diffusion of $Re^1$ in a direction from the outer surface to the center of the second phase grains.

Advantageous Effects

The method for manufacturing a multi-main-phase structure magnet according to one embodiment of the present disclosure can provide a multi-main-phase structure magnet having excellent magnetic properties due to a small diameter of crystal grains.

The method for manufacturing a multi-main-phase structure magnet according to one embodiment of the present disclosure can provide a multi-main-phase structure magnet having excellent magnetic properties by improving coercive force, residual magnetic flux density, and the like.

The multi-main-phase structure magnet according to one embodiment of the present disclosure can be manufactured at a low price while having excellent magnetic properties.

The multi-main-phase structure magnet according to one embodiment of the present disclosure can have superior magnetic properties than a single-phase structure magnet.

Effects of the present disclosure are not limited to the above-described effects, and effects not mentioned will be clearly understood by those skilled in the art from the present specification.

BEST MODE

Figure 1:
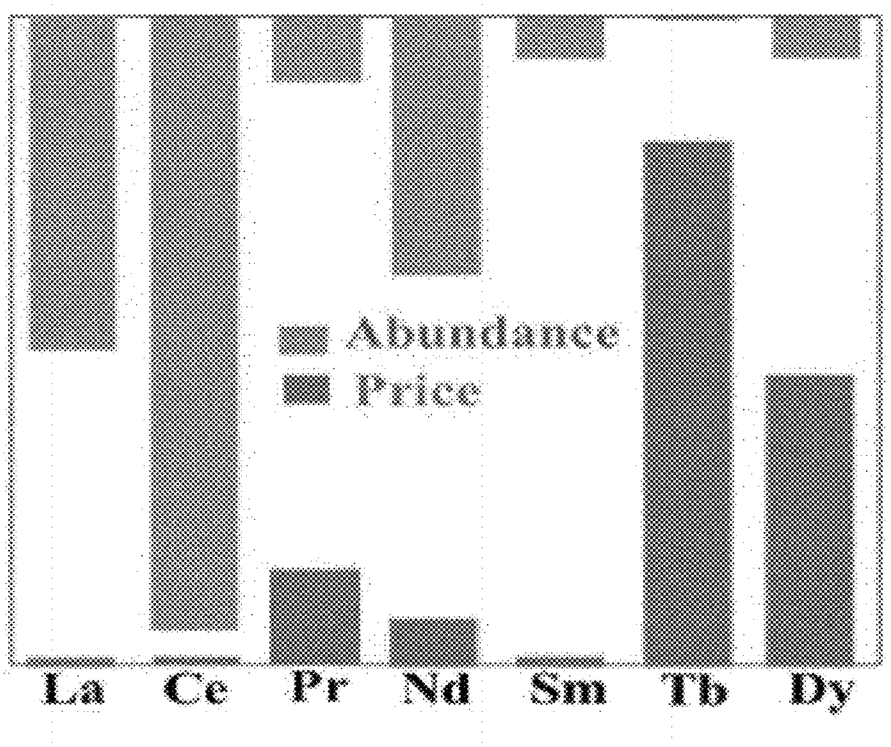
FIG. 1 is a graph showing outputs and prices of rare earth elements in China.

In the present specification, when a part "includes" a certain component, this means that other components may be further included rather than excluding other components unless otherwise stated.

Hereinafter, the present disclosure will be described in more detail.

According to one embodiment of the present disclosure, there is provided a method for manufacturing a multi-main-phase structure magnet, the method comprising steps of: preparing a mixed powder by mixing a first powder having a composition of $Re^1$—Fe—B and a second powder having a composition of $Re^2$—Fe—B; and manufacturing the mixed powder into an anisotropic bulk magnet by performing anisotropic bulking of the mixed powder, wherein the rare earth metals included in $Re^1$ are different from the rare earth metals included in $Re^2$ in one or more of a type and a content of the metals.

According to one embodiment of the present disclosure, the multi-main-phase structure magnet manufactured by the method for manufacturing a multi-main-phase structure magnet may comprise first and second crystal grains having different compositions by being prepared from first and second powders containing crystal grains having different compositions, and the first and second crystal grains may have excellent magnetic properties such as coercive force and saturation magnetization by including a diffusion region formed by diffusion of other elements from the outer surface thereof.

Hereinafter, each of the above steps will be described in detail.

According to one embodiment of the present disclosure, the step of preparing the first powder having the composition of $Re^1$—Fe—B and the second powder having the composition of $Re^2$—Fe—B may be first performed.

According to one embodiment of the present disclosure, the first powder and the second powder may be each independently prepared by pulverizing an alloy ribbon, or may be prepared by performing an HDDR process on an alloy powder.

Specifically, the first powder and the second powder may be each independently prepared through steps of: preparing an alloy having a composition of $Re^1$—Fe—B or $Re^2$—Fe—B; preparing a ribbon by melting and then quenching the alloy; and pulverizing the ribbon to powder it, the first powder and the second powder may be prepared using methods known in the corresponding technical field, such as melt spinning, gas atomization, water atomization, and high energy ball milling, and the preparation method is not limited to the methods listed above.

According to one embodiment of the present disclosure, the alloy may be prepared by adding a non-rare earth metal in order to improve properties in addition to the rare earth metal, iron, and boron in the step of preparing the alloy. For example, Ga, Co, Al, Cu, Nb, Ti, Si, Zr, Ta, V, Mo, Mn, Zn, Ni, Cr, Pb, Sn, In, Mg, Ag, Ge, etc. may be added, and the non-rare earth metal may be contained in an amount of about 10% by mole or less.

The first powder and the second powder may be prepared through hydrogenation, disproportionation, desorption, and recombination processes according to the HDDR process by obtaining an alloy powder having a composition of $Re^1$—Fe—B or $Re^2$—Fe—B as another method. Through the HDDR process, the crystal grains of the powder having large crystal grains may be refined and used as a raw material for the multi-main-phase magnet powder.

According to one embodiment of the present disclosure, the first powder and the second powder may be crystalline or amorphous, preferably amorphous. Each powder may be prepared in a crystalline or amorphous form by controlling the preparation process, and for example, a crystalline or amorphous powder may be prepared by controlling the cooling rate.

According to one embodiment of the present disclosure, the first powder and the second powder may be amorphous. When the first powder and the second powder are an amorphous powder, the $ReFe_2$ phase, which is an impurity phase contained in the multi-main-phase structure magnet manufactured, may be formed in a smaller amount, and thus magnetic properties may be excellent.

According to one embodiment of the present disclosure, when the first powder and the second powder are a crystalline powder, the first powder and the second powder may be formed of crystal grains having a maximum diameter of 1 μm or less. Since the first and second powders are formed of small crystal grains having a maximum diameter of 1 μm or less, the multi-main-phase structure magnet manufactured may have excellent magnetic properties.

According to one embodiment of the present disclosure, the first powder and the second powder may be an isotropic powder or an anisotropic powder. Specifically, the isotropic or anisotropic powder may be selected and used depending on by which method anisotropic bulking is performed in the anisotropic bulking process performed after mixing the powder later.

For example, when the preparation method comprises steps of: magnetic field-aligning the mixed powder by the anisotropic bulking; and performing sintering under pressure, the first powder and the second powder contained in the mixed powder may be an anisotropic powder.

According to one embodiment of the present disclosure, the rare earth metals included in $Re^1$ are different from the rare earth metals included in $Re^2$ in one or more of a type and a content of the metals.

Specifically, $Re^1$ and $Re^2$ may each independently include one or more rare earth metals selected from Sc, Y, La, Ce, Pr, Nd, Pm, Sm, Eu, Gd, Tb, Dy, Ho, Er, Tm, Yb, and Lu, and $Re^1$ and $Re^2$ may contain different types of rare earth metals, include the same rare earth metals in different amounts, or have different types and contents of the rare earth metals included. Preferably, $Re^1$ may include Nd and Pr, and $Re^2$ may include Nd, Ce, and La. Alternatively, both $Re^1$ and $Re^2$ may have different contents while including Nd and Ce. The rare-earth metal elements are not limited to the above-listed chemical species, and other rare-earth metal elements other than the above-listed chemical species may also be used, if necessary.

According to one embodiment of the present disclosure, $Re^2$ has a composition of $Nd_{1-x}Ce_x$, wherein x may be 0.2 to 1, 0.3 to 1, 0.2 to 0.8, 0.3 to 0.8, 0.2 to 0.6, 0.3 to 0.6, or 0.4 to 0.6. When the composition is within the above range, magnetic properties of the magnet manufactured may be excellent.

According to one embodiment of the present disclosure, the first powder and the second powder may have a particle diameter of 3 to 500 μm, and specifically, the first powder and the second powder may have a particle diameter of 3 μm or more, 10 μm or more, 50 μm or more, 125 μm or more, 500 μm or less, 300 μm or less, or 200 μm or less.

According to one embodiment of the present disclosure, a mixed powder is prepared by mixing a first powder having a composition of $Re^1$—Fe—B and a second powder having a composition of $Re^2$—Fe—B.

The mixing may be performed through a method generally used in the corresponding technical field, and may be performed using, for example, a device such as a 3D mixer, a magnetic stirrer, an acoustic resonance mixer, or the like. Further, the mixing may be performed until the first powder and the second powder are uniformly mixed, and the time for performing mixing may vary depending on the mixing method and the device used.

According to one embodiment of the present disclosure, the first powder and the second powder may be mixed at a weight ratio of 1:9 to 9:1, 1:9 to 7:3, 2.5:7.5 to 9:1, 2.5:7.5 to 7:3, 5:5 to 9:1, 5:5 to 7:3, or 5:5 to 6.25:3.75. The multi-main-phase structure magnet according to the present disclosure comprises crystal grains having different compositions, and has a multi-main-phase structure due to the diffusion region formed thereby to have excellent magnetic properties. When mixing the first powder and the second powder at a weight ratio within the above range, there may be an effect of improving magnetic properties due to crystal grains having different compositions or the magnetic exchange interaction between the crystal grains and the diffusion region.

According to one embodiment of the present disclosure, the first powder and the second powder may be mixed so that an atomic ratio of Nd:Ce in the total composition of the multi-main-phase structure magnet to be manufactured is 7:3 to 3:7. That is, the weight ratio of the first powder and the second powder may be adjusted in consideration of the composition of each powder and the composition of the magnet manufactured. For example, when $Re^1$ of the first powder is composed of Nd and $Re^2$ of the second powder is composed of $Nd_{0.5}Ce_{0.5}$, the weight ratio of the first powder to the second powder may be 4:6 or more.

Next, the mixed powder is anisotropically bulked to prepare an anisotropic bulk magnet.

According to one embodiment of the present disclosure, the anisotropic bulking refers to a process in which the crystal grains are sintered in a state in which the crystallographic easy magnetization direction is aligned in one direction, and the raw material powder is processed into an anisotropic bulk magnet.

According to one embodiment of the present disclosure, the anisotropic bulking may comprise steps of: magnetic field-aligning the mixed powder; and performing pressure sintering, or steps of: first pressure-sintering the mixed powder; and performing hot deformation.

The magnetic field-aligning step is a process of aligning the easy magnetization direction of the mixed powder in one direction. Specifically, it may be to align the direction in which the magnetization of the mixed powder is easy in the direction of the applied magnetic field by filling a molding mold with the mixed powder and applying a magnetic field of 100 G to 70,000 G. Further, the powder may be molded by applying a pressure of 1 GPa or less when a magnetic field is applied, but pressure is not necessarily applied.

According to one embodiment of the present disclosure, the mixed powder may first be pressure-sintered. Pressure sintering is not particularly limited in its method as long as sintering can be performed, but for example, it may be performed by any one method selected from the group consisting of hot press sintering, hot isostatic pressing, discharge plasma sintering, and microwave sintering. The pressure sintering process is a step of densely binding magnetic powder, and may be referred to as a step of bulking the magnet.

The pressure sintering may be performed using, for example, hot press equipment, and specifically, an apparatus for inserting a powder into the mold in the chamber, raising the temperature to a specific temperature in a vacuum or inert gas atmosphere, and then applying a pressure to the powder to sinter it may be used.

The pressure sintering may be performed by performing pressurization to 50 to 1,000 MPa at a temperature of 500 to 900° C. In the pressure sintering step, the mixed powder may be processed in a bulk form.

According to one embodiment of the present disclosure, the hot deformation process is not limited to a specific method, and may be performed by a method selected from hot extrusion, hot rolling, and hot forging, and preferably performed by hot forging. In the hot deformation process, the crystal grains may be aligned and anisotropically developed.

According to one embodiment of the present disclosure, the hot deformation process may be carried out at a temperature of 500 to 900° C., 500 to 800° C., or 500 to 650° C., under a pressure of 20 to 500 MPa, 50 to 300 MPa, or 50 to 150 MPa. When the hot deformation process is performed within the above temperature and pressure ranges, bulking of the powder and crystallographic anisotropic development of the crystal grains may be possible, and there may be an effect of improving magnetic properties.

According to one embodiment of the present disclosure, the hot deformation may be a process of deforming a bulk magnet, and the bulk magnet may be deformed by hot deformation such that the strain is 1 to 2. The strain may be expressed by Equation 1 below.

$$\varepsilon = \ln(h_0/h) \quad \text{[Equation 1]}$$

in Equation 1, $\varepsilon$ means a strain, $h_0$ is a height of the initial sample, and h is a height of the sample after deformation.

When the strain satisfies a value within the above range, the residual magnetic flux density may be increased by grain anisotropic development. Specifically, the spherical crystal grains during the hot deformation process may be changed to a plate shape along with grain growth. The plate shape may correspond to a shape extending in a direction perpendicular to a direction in which magnetization is easy. The melting point of the grain boundary phase at the grain boundary is lower than the process temperature so that the grain boundary phase exists in the liquid phase during the process. At this time, when the sample is pressurized, while the inner crystal grains are rotated, and the easy magnetization direction of each crystal grain is aligned horizontally with the pressurization direction, thereby causing crystallographic anisotropic development.

Further, the hot deformation may deform the bulk magnet at a deformation rate of 0.001/s to 1.0/s, and the deformation rate may be expressed by Equation 2 below.

$$\acute{\varepsilon}=\varepsilon/t \quad \text{[Equation 2]}$$

where $\acute{\varepsilon}$ is a deformation rate, $\varepsilon$ is a strain, and t is a time.

The deformation rate may vary depending on conditions such as the composition of the powder, the diameter of the crystal grains, and the temperature at which the process is performed.

According to one embodiment of the present disclosure, after the anisotropic bulk magnet is manufactured as described above, a multi-main-phase structure magnet may be manufactured by post-heat treating it.

Through the post-heat treatment process, $Re^1$ or $Re^2$ is diffused to increase the diffusion region, and the magnetic interaction between the first and second phase grains contained in the multi-main-phase structure magnet is increased to obtain an effect of improving magnetic properties such as coercive force, residual magnetic flux density, and the like.

According to one embodiment of the present disclosure, the post-heat treatment may be performed at a temperature of 400 to 800° C., 500 to 800° C., or 700 to 800° C. for 10 to 600 minutes, 30 to 500 minutes, or 50 to 200 minutes. When the post-heat treatment is performed under conditions within the above temperature and time ranges, the magnetic interaction of the multi-main-phase structure magnet to be manufactured can be increased more efficiently.

A multi-main-phase structure magnet manufactured according to a manufacturing method according to one embodiment of the present disclosure comprises: first phase grains comprising $Re^1$—Fe—B; second phase grains comprising $Re^2$—Fe—B; and a grain boundary phase, wherein the rare earth metals included in $Re^1$ are different from the rare earth metals included in $Re^2$ in one or more of a type and a content of the metals, the first phase grains and the second phase grains have a maximum diameter of 1 μm or less, the grain boundary phase exists at one or more positions of: a space between the first phase grains; a space between the second phase grains; and a space between the first phase grains and the second phase grains, the first phase grains include a first diffusion region formed by diffusion of $Re^2$ in a direction from the outer surface to the center of the first phase grains, and the second phase grains include a second diffusion region formed by diffusion of $Re^1$ in a direction from the outer surface to the center of the second phase grains.

The multi-main-phase (MMP) structure may refer to a structure in which the first phase grains and the second phase grains include various phases by including a first diffusion region containing $Re^2$ and a second diffusion region containing $Re^1$ respectively. Due to such a multi-main-phase structure, the multi-main-phase structure magnet manufactured by the method according to one embodiment of the present disclosure may have excellent magnetic properties.

Figure 2:
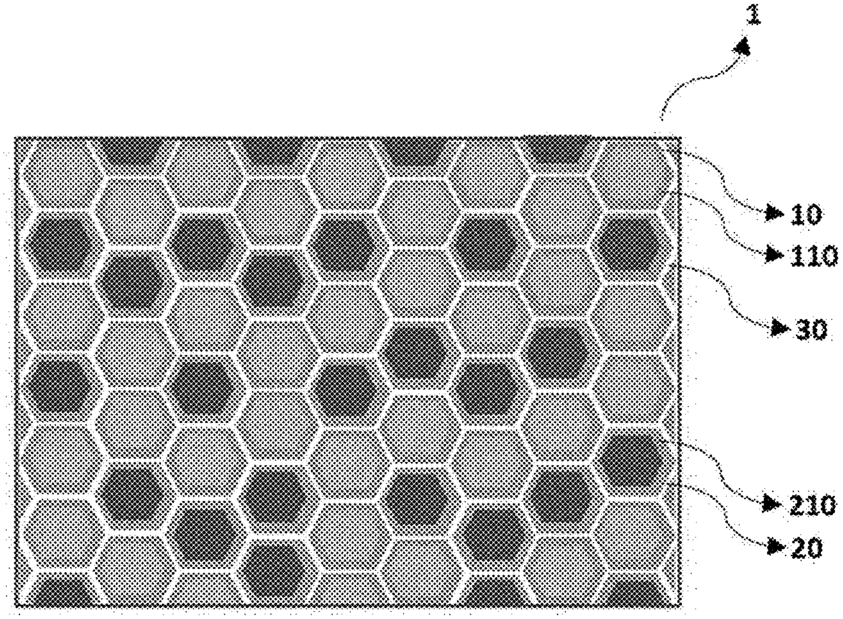
FIG. 2 is a cross-sectional schematic view of a multi-main-phase structure magnet manufactured by the method according to one embodiment of the present disclosure.

FIG. 2 is a cross-sectional schematic view of a multi-main-phase structure magnet according to one embodiment of the present disclosure. Hereinafter, the multi-main-phase structure magnet according to one embodiment of the present disclosure will be described in detail with reference to FIG. 2.

A multi-main-phase structure magnet 1 according to one embodiment of the present disclosure may comprise: first phase grains 10; second phase grains 20; and a grain boundary phase 30, wherein the first phase grains 10 may include a first diffusion region 110, and the second phase grains 20 may include a second diffusion region 210.

The first phase grains 10 comprise $Re^1$—Fe—B, and the second phase grains 20 comprise $Re^2$—Fe—B. $Re^1$ and $Re^2$ include rare earth metals, and the type of rare earth metals included in $Re^1$ is different from the type of rare earth metals included in $Re^2$ in one or more types. That is, $Re^1$ and $Re^2$ may each include single type different rare earth metals, or may include one or more different rare earth metals in different compositions, and the first phase grains and the second phase crystal grains may have different compositions for rare earth metals.

According to one embodiment of the present disclosure, $Re^1$ and $Re^2$ may each independently include one or more rare earth metals. Specifically, $Re^1$ and $Re^2$ may include one or more of Sc, Y, La, Ce, Pr, Nd, Pm, Sm, Eu, Gd, Tb, Dy, Ho, Er, Tm, Yb, and Lu. For example, $Re^1$ may include Nd, and $Re^2$ may include Nd and Ce. Preferably, $Re^1$ may include Nd and Pr, and $Re^2$ may include Nd, Ce, and La. The rare earth metal elements are not limited to the chemical species listed above, and other rare earth metal elements may be used as needed.

According to one embodiment of the present disclosure, the multi-main-phase structure magnet has a composition of $Nd_aR_bFe_{100-a-b-c-d}M_cB_d$, wherein R may include one or more of Sc, Y, La, Ce, Pr, Pm, Sm, Eu, Gd, Tb, Dy, Ho, Er, Tm, Yb, and Lu, M may include one or more of Ga, Co, Al, Cu, Nb, Ti, Si, Zr, Ta, V, Mo, Mn, Zn, Ni, Cr, Pb, Sn, In, Mg, Ag, and Ge, a may be 0 or more and 20 or less, b may be 0 or more and 20 or less, c may be 0 or more and 15 or less, and d may be 0 or more and 15 or less. The composition, as a total composition including all compositions of the first phase grains, the second phase grains, and the grain boundary phase, may satisfy the above composition formula.

According to one embodiment of the present disclosure, the first phase grains 10 may include a first diffusion region 110, and the second phase grains 20 may include a second diffusion region 210. The first diffusion region 110 and the second diffusion region 210 may be formed as $Re^2$ and $Re^1$ diffuse in a direction from the outer surface of the first and second phase grains to the center thereof respectively. That is, the first diffusion region 110 and the second diffusion region 210 may be a structure formed by infiltration and diffusion of different phases of rare earth metals during the manufacturing process of the multi-main-phase structure magnet.

The first phase grains 10 and the second phase grains 20 contained in the multi-main-phase structure magnet manufactured according to the manufacturing method according to one embodiment of the present disclosure may be formed in a form having an aspect ratio of more than 1 and 10 or less, 2 to 5, or 3 to 4. That is, the first phase grains 10 and the second phase grains 20 are pressurized while being manufactured according to the manufacturing method according to one embodiment of the present disclosure, and may be molded into a flat shape while pressure is applied to the crystal grains, and it may be possible to manufacture a multi-main-phase structure magnet having a form within the above aspect ratio range.

The multi-main-phase structure magnet 1 according to one embodiment of the present disclosure may comprise a grain boundary phase 30, wherein the grain boundary phase 30 may be positioned in a space between the first phase grains, a space between the second phase grains, and/or a space between the first phase grains and the second phase grains. That is, the grain boundary phase 30 may be located in a space between independent crystal grains that are distinguished from each other.

The grain boundary phase 30 may be a region that is melted by high temperatures or high pressures in the manufacturing process of the multi-main-phase structure magnet 1, and accordingly, may serve as a passage in which $Re^1$ contained in the first phase grains 10 and $Re^2$ contained in the second phase grains 20 diffuse.

Figure 3:
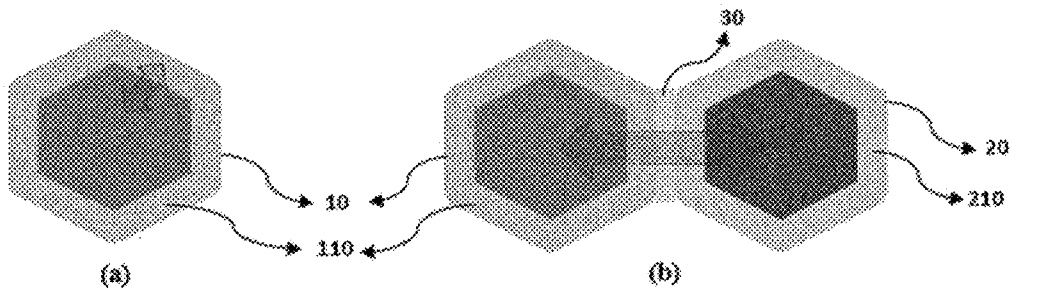
FIG. 3 is a schematic diagram showing the magnetic interaction of a multi-main-phase structure magnet manufactured by the method according to one embodiment of the present disclosure.

FIG. 3 is a schematic diagram showing the magnetic interaction of a multi-main-phase structure according to one embodiment of the present disclosure.

Referring to FIGS. 2 and 3, in the multi-main-phase structure magnet manufactured by the method according to one embodiment of the present disclosure, the first diffusion region 110, the second diffusion region 210, and the grain boundary phase 30 may affect the magnetic interaction, and thus the magnetic properties of the multi-main-phase structure magnet may be excellent. Specifically, in the case of a multi-main-phase structure magnet including the first diffusion region 110 and the second diffusion region 210, the magnetic exchange interaction may be excellent due to a short distance between the central portion (not shown) and the first diffusion region 110 of the first phase grains, and the magnetic exchange interaction may be equally excellent due to a short distance between the central portion (not shown) and the second diffusion region 210 of the second phase grains so that the magnetic properties of the multi-main-phase structure magnet may be excellent (FIG. 3A). At the same time, the magnetic exchange interaction even between the first phase grains 10 and the second phase grains 20 of different compositions is excellent (FIG. 3B) so that the magnetic properties of the multi-main-phase structure magnet may be more excellent. The magnetic exchange interaction may mean that, in magnetic materials having different compositions, a magnetic material having relatively strong magnetism interacts in a form that prevents magnetization reversal of a magnetic material having lower magnetism.

The multi-main-phase structure magnet manufactured by the method according to one embodiment of the present disclosure may have a coercive force of 5 to 50 kOe or more. Specifically, the multi-main-phase structure magnet may have a coercive force of 5 kOe or more, 10 kOe or more, 15 kOe or more, 50 kOe or less, 40 kOe or less, or 35 kOe or less.

Hereinafter, Examples will be given and described in detail in order to specifically describe the present disclosure. However, the embodiments according to the present disclosure may be modified in various other forms, and the scope of the present disclosure is not to be construed as being limited to the Examples described below. The Examples of the present specification are provided to more completely explain the present disclosure to those of ordinary skill in the art.

MODES FOR CARRYING OUT THE INVENTION

Preparation Example 1

Fe, Nd, FeB, Ga, and Co metals were prepared into an ingot having a composition of $Nd_{13.6}Fe_{73.6}B_{5.6}Ga_{0.6}Co_{6.6}$ by arc-melting, and then the ingot was melt-spun at a speed of 28 m/s to prepare a ribbon. The prepared ribbon was pulverized into particles having a maximum diameter of 100 μm to prepare a crystalline first powder.

Preparation Example 2

A crystalline second powder was prepared in the same manner as in Preparation Example 1 except that an ingot having a composition of $(Nd_{0.6}Ce_{0.4})_{13.6}Fe_{bal}B_{5.6}Ga_{0.6}Co_{6.6}$ was used in Preparation Example 2.

Preparation Example 3

A crystalline third powder was prepared in the same manner as in Preparation Example 1 except that an ingot having a composition of $(Nd_{0.8}Ce_{0.2})_{13.6}Fe_{bal}B_{5.6}Ga_{0.6}Co_{6.6}$ was used in Preparation Example 3.

Preparation Example 4

A crystalline fourth powder was prepared in the same manner as in Preparation Example 1 except that an ingot having a composition of $(Nd_{0.7}Ce_{0.3})_{13.6}Fe_{bal}B_{5.6}Ga_{0.6}Co_{6.6}$ was used in Preparation Example 4.

Preparation Example 5

An amorphous fifth powder was prepared in the same manner as in Preparation Example 1 except that the ingot was melt-spun at a speed of 35 m/s to prepare a ribbon in Preparation Example 5.

Preparation Example 6

An amorphous sixth powder was prepared in the same manner as in Preparation Example 5 except that an ingot having a composition of $(Nd_{0.6}Ce_{0.4})_{13.6}Fe_{bal}B_{5.6}Ga_{0.6}Co_{6.6}$ was used in Preparation Example 6.

Preparation Example 7

An amorphous seventh powder was prepared in the same manner as in Preparation Example 5 except that an ingot having a composition of $(Nd_{0.7}Ce_{0.3})_{13.6}Fe_{bal}B_{5.6}Ga_{0.6}Co_{6.6}$ was used in Preparation Example 7.

Preparation Example 8

An amorphous eighth powder was prepared in the same manner as in Preparation Example 5 except that an ingot having a composition of $(Nd_{0.4}Ce_{0.6})_{13.6}Fe_{bal}B_{5.6}Ga_{0.6}Co_{6.6}$ was used in Preparation Example 8.

Preparation Example 9

An amorphous ninth powder was prepared in the same manner as in Preparation Example 5 except that an ingot having a composition of $(Nd_{0.2}Ce_{0.8})_{13.6}Fe_{bal}B_{5.6}Ga_{0.6}Co_{6.6}$ was used in Preparation Example 9.

Preparation Example 10

An amorphous tenth powder was prepared in the same manner as in Preparation Example 5 except that an ingot having a composition of $Ce_{13.6}Fe_{bal}B_{5.6}Ga_{0.6}Co_{6.6}$ was used in Preparation Example 10.

The preparation conditions of Preparation Examples 1 to 10 are summarized in Table below.

TABLE 1

| | Composition | Whether it is crystalline or not |
|---|---|---|
| Preparation Example 1 | $Nd_{13.6}Fe_{73.6}B_{5.6}Ga_{0.6}Co_{6.6}$ | Crystalline |
| Preparation Example 2 | $(Nd_{0.6}Ce_{0.4})_{13.6}Fe_{bal}B_{5.6}Ga_{0.6}Co_{6.6}$ | Crystalline |
| Preparation Example 3 | $(Nd_{0.8}Ce_{0.2})_{13.6}Fe_{bal}B_{5.6}Ga_{0.6}Co_{6.6}$ | Crystalline |
| Preparation Example 4 | $(Nd_{0.7}Ce_{0.3})_{13.6}Fe_{bal}B_{5.6}Ga_{0.6}Co_{6.6}$ | Crystalline |
| Preparation Example 5 | $Nd_{13.6}Fe_{73.6}B_{5.6}Ga_{0.6}Co_{6.6}$ | Amorphous |
| Preparation Example 6 | $(Nd_{0.6}Ce_{0.4})_{13.6}Fe_{bal}B_{5.6}Ga_{0.6}Co_{6.6}$ | Amorphous |
| Preparation Example 7 | $(Nd_{0.7}Ce_{0.3})_{13.6}Fe_{bal}B_{5.6}Ga_{0.6}Co_{6.6}$ | Amorphous |
| Preparation Example 8 | $(Nd_{0.4}Ce_{0.6})_{13.6}Fe_{bal}B_{5.6}Ga_{0.6}Co_{6.6}$ | Amorphous |
| Preparation Example 9 | $(Nd_{0.2}Ce_{0.8})_{13.6}Fe_{bal}B_{5.6}Ga_{0.6}Co_{6.6}$ | Amorphous |
| Preparation Example 10 | $Ce_{13.6}Fe_{bal}B_{5.6}Ga_{0.6}Co_{6.6}$ | Amorphous |

Example 1-1

A mixed powder was prepared by mixing the first powder prepared in Preparation Example 1 and the second powder prepared in Preparation Example 2 so that the weight ratio of the first powder to the second powder was 1:3. The mixed powder was put into a mold of pressure sintering equipment and mounted, and pressure-sintered to 100 MPa at 700° C. for 3 minutes to manufacture it into a bulk magnet. An anisotropic bulk magnet was manufactured by hot-deforming the manufactured bulk magnet to a deformation rate of 0.1 $s^{-1}$ at 700° C. so that the strain was 1.5.

Example 2-1

An anisotropic bulk magnet was manufactured in the same manner as in Example 1-1 except that in Example 2-1 the fifth powder was used instead of the first powder, and the sixth powder was used instead of the second powder in Example 1-1.

Example 3-1

An anisotropic bulk magnet was manufactured in the same manner as in Example 2-1 except that in Example 3-1, the eighth powder was used instead of the sixth powder, and the fifth powder and the eighth powder were mixed so that the weight ratio of the fifth powder to the eighth powder was 1:1.

Example 4-1

An anisotropic bulk magnet was manufactured in the same manner as in Example 2-1 except that in Example 4-1, the ninth powder was used instead of the sixth powder, and the fifth powder and the ninth powder were mixed so that the weight ratio of the fifth powder to the ninth powder was 5:3.

Example 5-1

An anisotropic bulk magnet was manufactured in the same manner as in Example 2-1 except that in Example 5-1, the tenth powder was used instead of the sixth powder, and the fifth powder and the tenth powder were mixed so that the weight ratio of the fifth powder to the tenth powder was 7:3.

Examples 1-2, 2-2, 3-2, 4-2, and 5-2

The multi-main-phase structure magnet manufactured in Example 1-1, 2-1, 3-1, 4-1, or 5-1 was subjected to post-heat treatment at 600° C. for 1 hour to manufacture a multi-main-phase structure magnet.

Examples 1-3, 2-3, 3-3, 4-3, and 5-3

The multi-main-phase structure magnet manufactured in Example 1-1, 2-1, 3-1, 4-1, or 5-1 was subjected to post-heat treatment at 600° C. for 3 hour to manufacture a multi-main-phase structure magnet.

Examples 1-4, 2-4, 3-4, 4-4, and 5-4

The multi-main-phase structure magnet manufactured in Example 1-1, 2-1, 3-1, 4-1, or 5-1 was subjected to post-heat treatment at 700° C. for 1 hour to manufacture a multi-main-phase structure magnet.

Examples 1-5, 2-5, 3-5, 4-5, and 5-5

The multi-main-phase structure magnet manufactured in Example 1-1, 2-1, 3-1, 4-1, or 5-1 was subjected to post-heat treatment at 700° C. for 3 hour to manufacture a multi-main-phase structure magnet.

Comparative Example 1

After preparing the fourth powder prepared in Preparation Example 4, it was put into pressure sintering equipment and mounted, and pressure-sintered to 100 MPa at 700° C. for 3 minutes to manufacture it into a bulk magnet. An anisotropic bulk magnet was manufactured by hot-deforming the manufactured bulk magnet to a deformation rate of 0.1 $s^{-1}$ at 700° C. so that the strain was 1.5. The manufactured magnet was subjected to post-heat treatment at 700° C. for 1 hour to manufacture a single-phase structure magnet.

Comparative Example 2

A single-phase structure magnet was manufactured in the same manner as in Comparative Example 1 except that in Comparative Example 2 the seventh powder was used instead of the fourth powder in Comparative Example 1.

Confirmation of SEM Images

The multi-main-phase structure magnets manufactured in Examples 1-1 and 2-1 were cut, and cut surfaces were photographed at a magnification of ×5000 to ×50000 using a scanning electron microscope (SEM, JEOL Ltd., 7001F).

Figure 4:
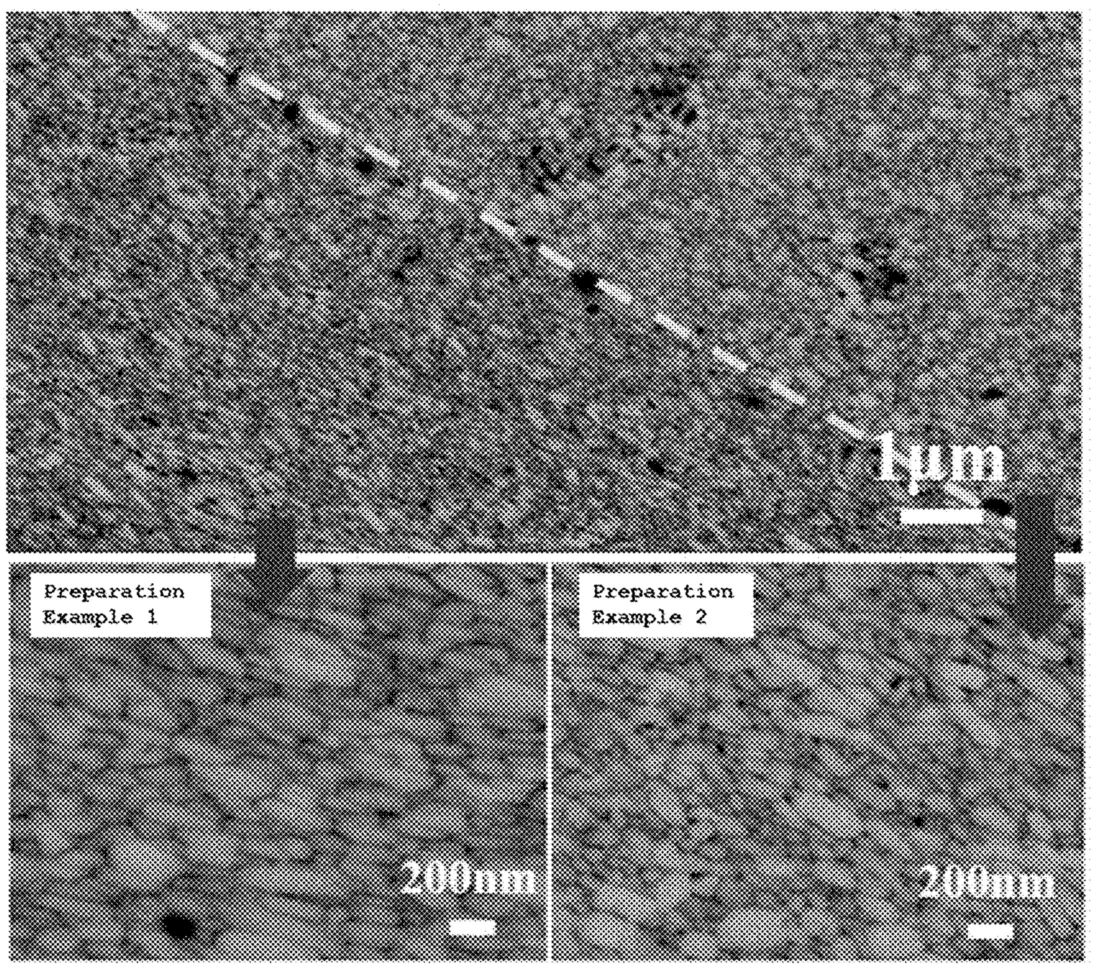
FIG. 4 is SEM images of cut surfaces of the multi-main-phase structure magnet manufactured in Example 1-1.
Figure 5:
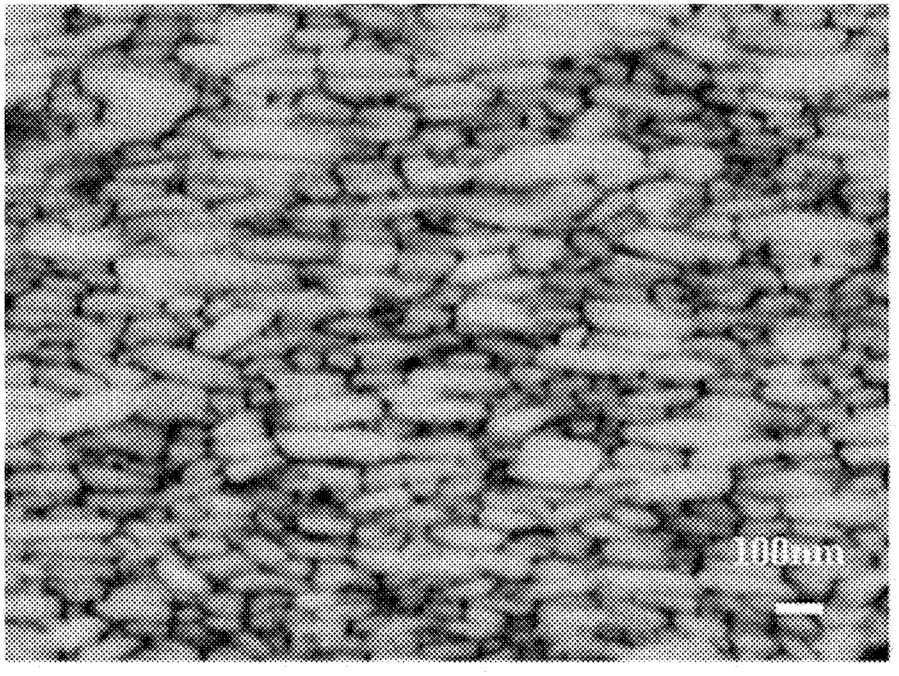
FIG. 5 is a SEM image of a cut surface of the multi-main-phase structure magnet manufactured in Example 2-1.

FIGS. 4 and 5 show SEM images of the cut surfaces of the multi-main-phase structure magnets manufactured in Examples 1-1 and 2-1 respectively.

Referring to FIG. 4, it can be observed that the multi-main-phase structure magnet manufactured in Example 1-1 comprises crystal grains having a diameter of about 200 nm. Further, referring to FIG. 5, it can be confirmed that the multi-main-phase structure magnet manufactured in Example 2-1 also comprises crystal grains having a similar shape, and the inner crystal grains are better aligned in a single direction. As will be described later, the magnetic properties of the magnet such as the residual magnetization value may be relatively more excellent depending on such a crystal grain shape, and the magnetic exchange interaction may appear more effectively.

Measurement and Evaluation of Coercive Force and Residual Magnetization

The multi-main-phase structure magnets manufactured in Examples 1-1 to 5-5 and the single-phase structure magnet manufactured in Comparative Example 1 were processed to a size of 3 cm×3 cm×1 cm, and then magnetized using a 7T pulsed magnetic field. The magnetized samples were swept by applying a magnetic field in the range of −1.8 T to 1.8 T using a vibrating sample magnetometer (VSM, Lake Shore), and magnetic properties of coercive force and residual magnetization were measured.

Figure 6:
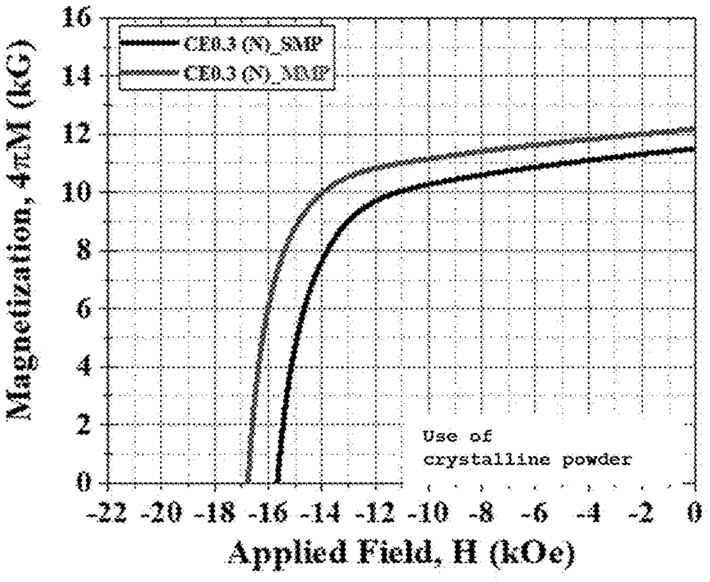
FIG. 6 is a graph comparing demagnetization curves of the single-phase structure magnet manufactured in Comparative Example 1 and the multi-main-phase structure magnet manufactured in Example 1-4.
Figure 7:
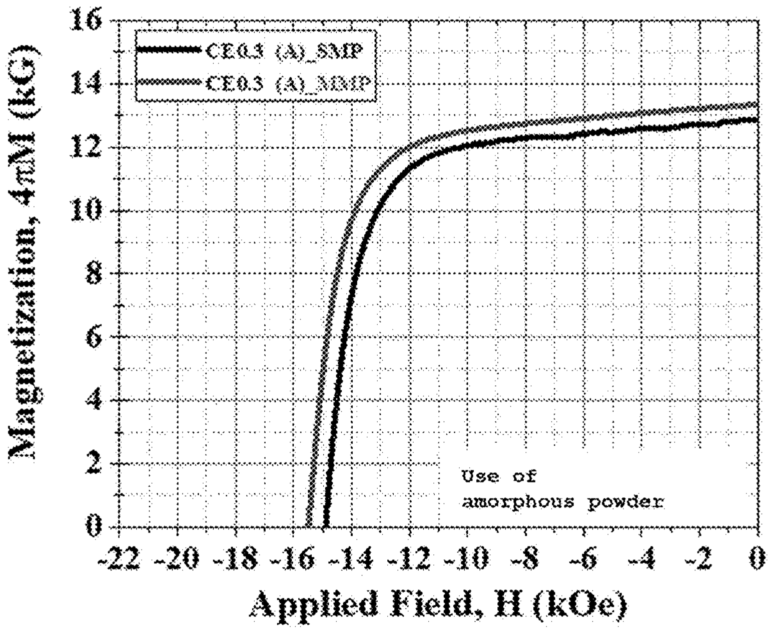
FIG. 7 is a graph comparing demagnetization curves of the single-phase structure magnet manufactured in Comparative Example 2 and the multi-main-phase structure magnet manufactured in Example 2-4.
Figure 8:
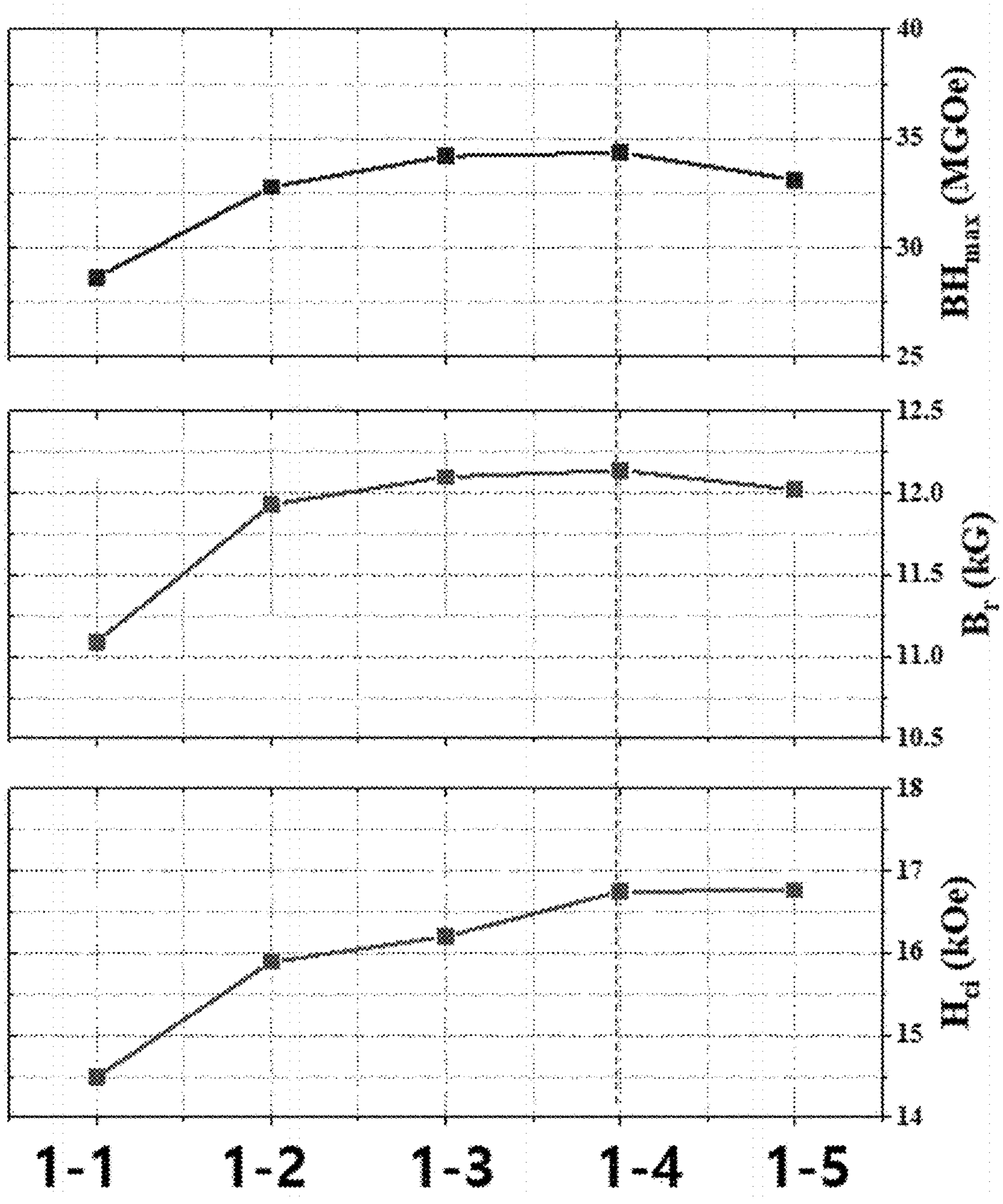
FIG. 8 is graphs showing coercive force, residual magnetization, and maximum magnetic energy product of the multi-main-phase structure magnets manufactured in Examples 1-1 to 1-5.
Figure 9:
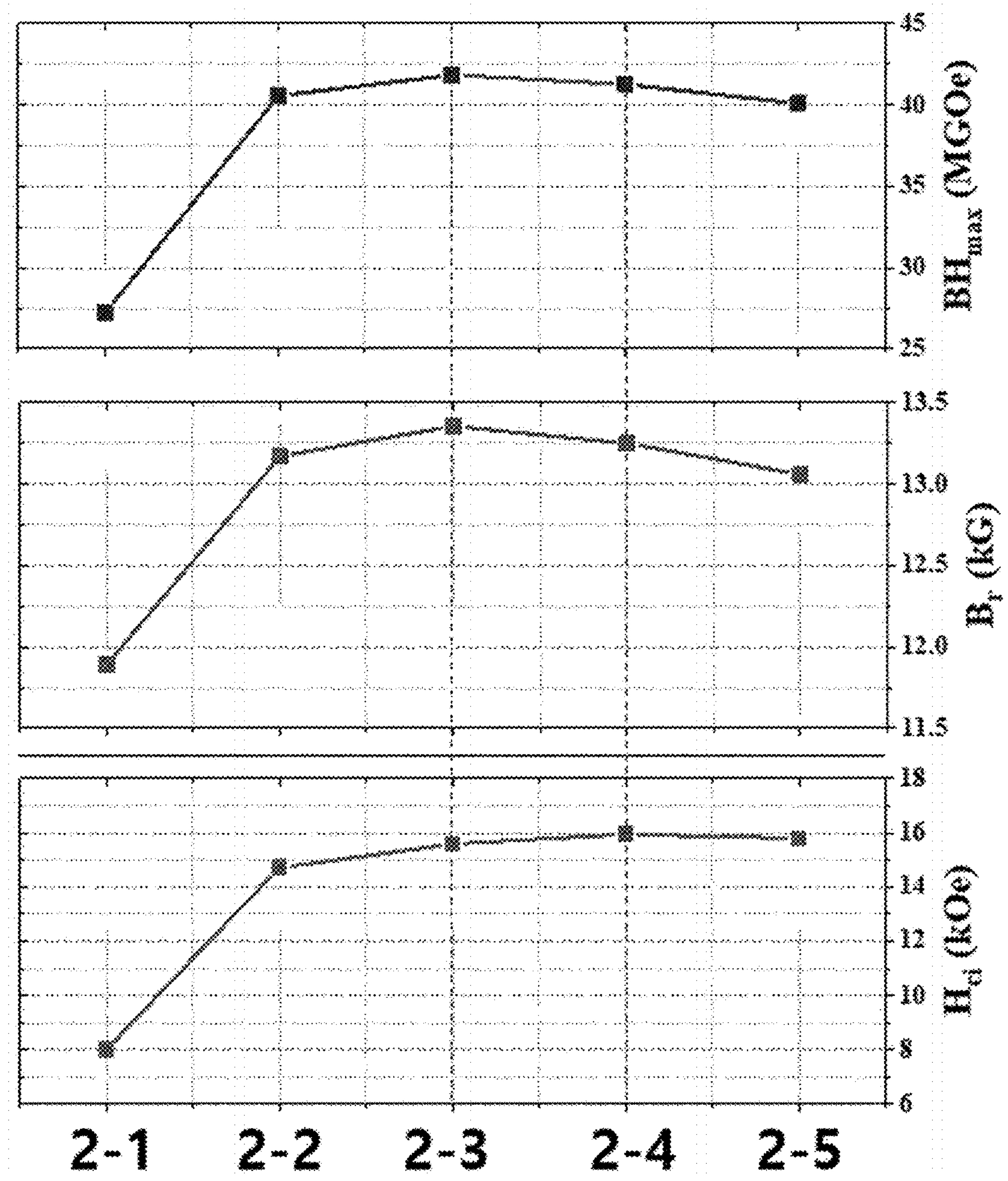
FIG. 9 is graphs showing coercive force, residual magnetization, and maximum magnetic energy product of the multi-main-phase structure magnets manufactured in Examples 2-1 to 2-5.
Figure 10:
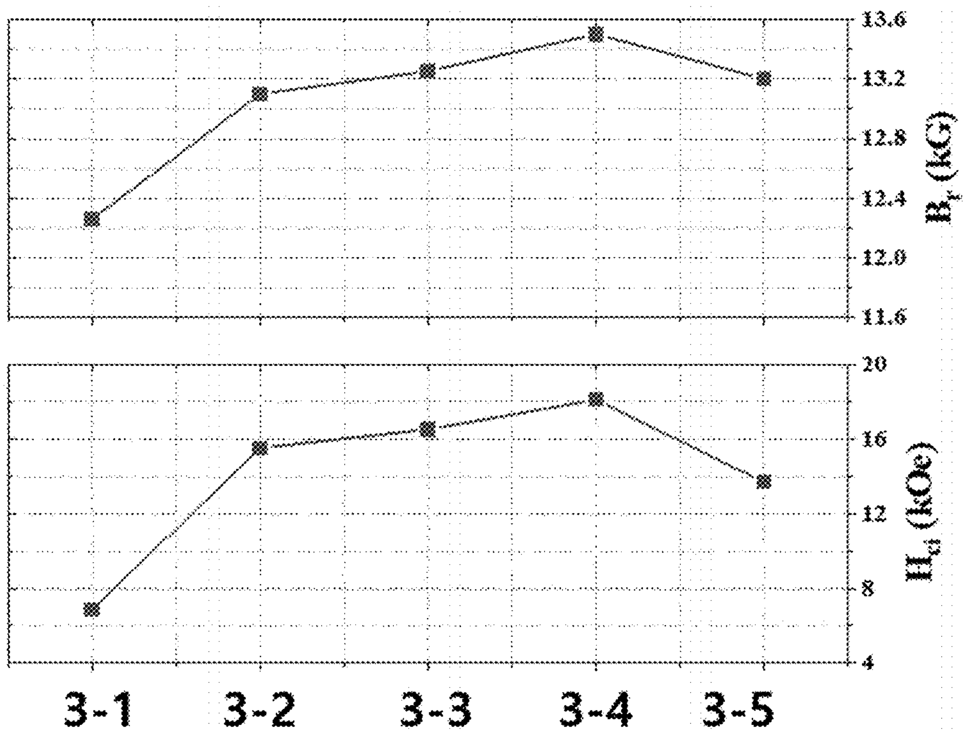
FIG. 10 is graphs showing coercive force and residual magnetization of the multi-main-phase structure magnets manufactured in Examples 3-1 to 3-5.
Figure 11:
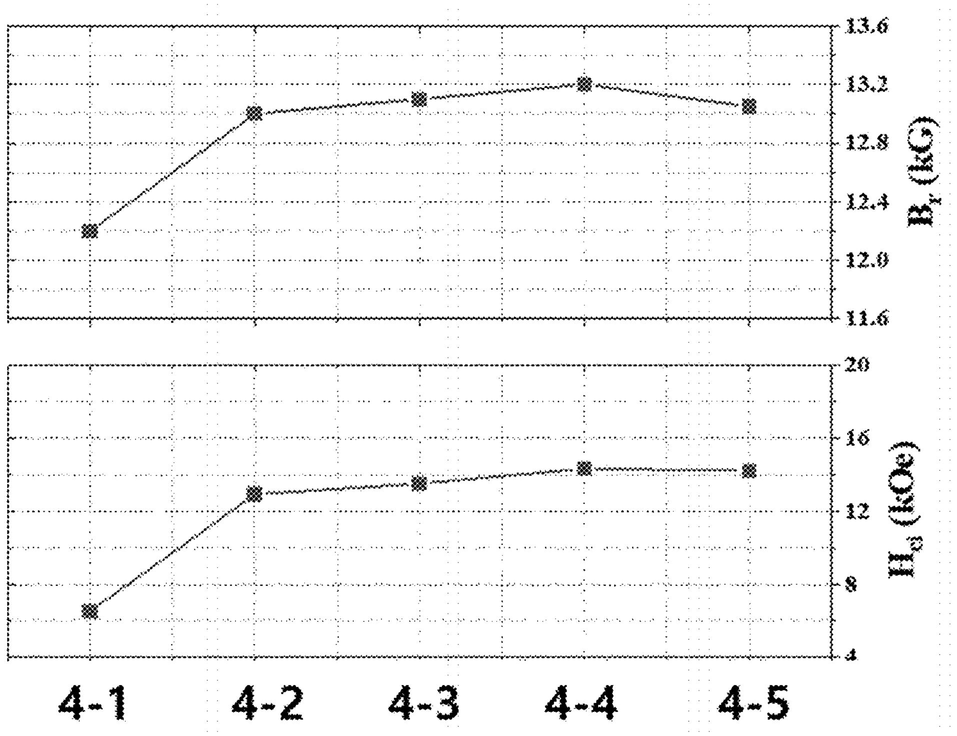
FIG. 11 is graphs showing coercive force and residual magnetization of the multi-main-phase structure magnets manufactured in Examples 4-1 to 4-5.
Figure 12:
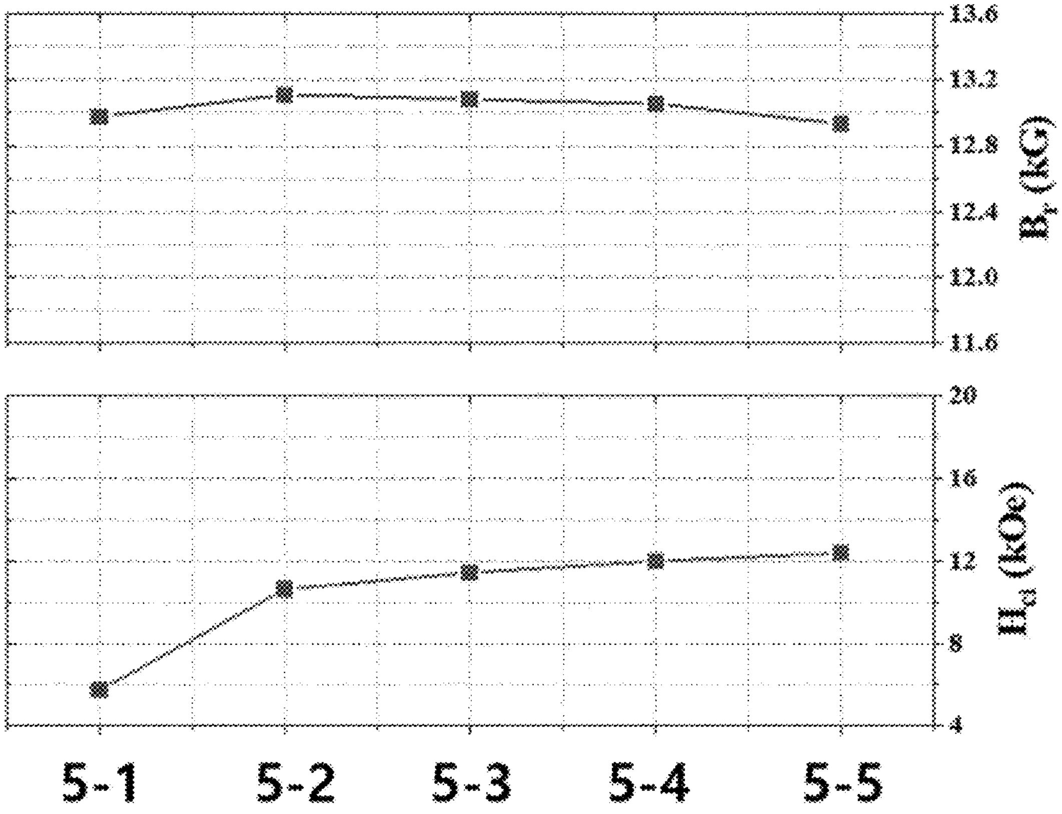
FIG. 12 is graphs showing coercive force and residual magnetization of the multi-main-phase structure magnets manufactured in Examples 5-1 to 5-5.

FIG. 6 shows the demagnetization curves of the magnets manufactured in Example 1-4 (red) and Comparative Example 1 (black), and FIG. 7 shows the demagnetization curves of the magnets manufactured in Example 2-4 (red) and Comparative Example 2 (black).

Referring to FIGS. 6 and 7, it can be confirmed that the magnetic properties of the multi-main-phase structure magnets are more excellent than those of the single-phase structure magnets. Further, in the case of the multi-main-phase structure magnets, it can be confirmed that the magnetic properties (residual magnetization) of the magnets are superior when the amorphous powder is used than when the crystalline powder is used.

FIGS. 8 to 12 are respectively graphs showing coercive force, residual magnetization, and maximum magnetic energy product of the multi-main-phase structure magnets manufactured in Examples 1-1 to 1-5, Examples 2-1 to 2-5, Examples 3-1 to 3-5, Examples 4-1 to 4-5, and Example 5-1 to 5-5.

Referring to FIGS. 8 to 12, it can be confirmed that the coercive force, residual magnetization, and maximum magnetic energy product of the multi-main-phase structure magnets are improved by performing the post-heat treatment. Specifically, it can be confirmed that the magnetic properties are most excellently improved when performing the post-heat treatment at 600° C. for 3 hours or performing the post-heat treatment at 700° C. for 1 hour in most Examples. Particularly, it can be confirmed that the magnetic properties of Example 3-4 are the most excellent.

Confirmation of Diffusion Region Expansion Due to Post-Heat Treatment

Scanning electron microscope (SEM) images of the multi-main-phase structure magnets manufactured in Examples 1-1 and 1-4 were taken. Specifically, SEM images of the multi-main-phase structure magnets manufactured in Examples 1-1 and 1-4 were taken at a magnification of ×5000 by using a scanning electron microscope (SEM, JEOL Ltd., 7001F), and the boundary curves between the powders were shown on the SEM images. In addition, mapping images of Ce and Nd elements were taken with an energy dispersive spectrometer (EDS), and the contents of Ce and Nd elements were measured by line scans on straight lines between crystal grains (straight lines on the SEM images).

Figure 13:
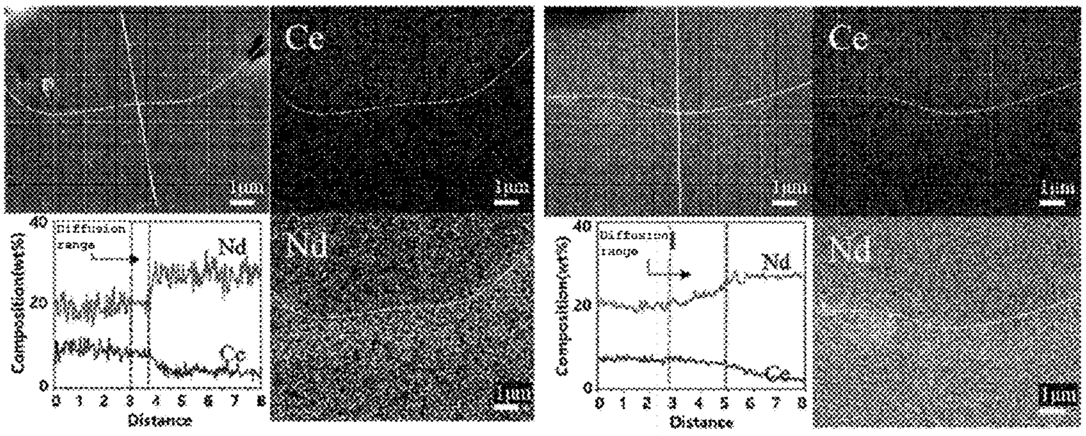
FIG. 13 is SEM images (FIG. 13A) of the multi-main-phase structure magnets manufactured in Examples 1-1 and 1-4, and mapping images (FIGS. 13B and 13C) and line scan results (FIG. 13D) for Ce and Nd composition distributions thereof.

FIG. 13 shows SEM images (FIG. 13A) of the multi-main-phase structure magnets manufactured in Examples 1-1 and 1-4, and mapping images (FIGS. 13B and 13C) and line scan results (FIG. 13D) for Ce and Nd composition distributions thereof. In Example 1-4, it can be confirmed that the diffusion regions of Ce and Nd at the interface between the first powder and the second powder are wider. That is, it can be seen that the rare earth metals of different compositions can be diffused to a deeper region through the post-heat treatment, and thus, the magnetic properties of the multi-main-phase structure magnets manufactured accordingly are excellent.

Summarizing FIGS. 8 to 13, it can be confirmed that, as the region where the $Re^1$ component of the first powder and the $Re^2$ component of the second powder diffuse to each other increases through the post-heat treatment at an appropriate temperature and time, it is possible to form multi-main-phase structure magnets having more excellent magnetic properties, and the post-heat treatment temperature and time have a great influence on the magnetic properties of the multi-main-phase structure magnets being manufactured.

Summarizing the above contents, it can be confirmed that the multi-main-phase structure magnet manufactured by the manufacturing method according to one embodiment of the present disclosure has excellent coercive force and residual magnetization by comprising the first phase grains, the second phase grains, and the diffusion regions.

EXPLANATION OF REFERENCE NUMERALS

1: Multi-main-phase structure magnet
10: First phase grains
20: Second phase grains
30: Grain boundary phase
110: First diffusion region
210: Second diffusion region

The invention claimed is:

1. A method for manufacturing a multi-main-phase structure magnet, the method comprising steps of:

preparing a mixed powder by mixing a first powder having a composition of $Re^1$—Fe—B and a second powder having a composition of $Re^2$—Fe—B; and manufacturing the mixed powder into an anisotropic bulk magnet by performing anisotropic bulking of the mixed powder, wherein:

$Re^1$ includes Nd, $Re^2$ includes Nd and Ce, combined mole fractions of Nd and Ce in $Re^2$ are equal to a mole fraction of Nd in $Re^1$, and the rare earth metals included in $Re^1$ are different from the rare earth metals included in $Re^2$ in one or more of a type and a content of the metals.

2. The method of claim 1, wherein the first powder and the second powder are crystalline.

3. The method of claim 2, wherein the first powder and the second powder are formed of crystal grains having a diameter of 1 μm or less.

4. The method of claim 1, wherein the first powder and the second powder are amorphous.

5. The method of claim 1, wherein the first powder and the second powder are mixed at a weight ratio of 1:9 to 9:1.

6. The method of claim 1, wherein the first powder and the second powder are each independently prepared through steps of:

preparing an alloy having a composition of $Re^1$—Fe—B or $Re^2$—Fe—B;

preparing a ribbon by melting and then quenching the alloy; and pulverizing the ribbon to powder the ribbon.

7. The method of claim 1, wherein $Re^1$ and $Re^2$ each independently include one or more additional rare earth metals selected from Sc, Y, La, Pr, Pm, Sm, Eu, Gd, Tb, Dy, Ho, Er, Tm, Yb, and Lu.

8. The method of claim 1, wherein $Re^2$ has a composition of $Nd_{1-x}Ce_x$, and wherein x is 0.2 to 0.8.

9. The method of claim 1, wherein the first powder and the second powder are mixed so that an atomic ratio of Nd:Ce in the total composition of the multi-main-phase structure magnet to be manufactured is 7:3 to 3:7.

10. The method of claim 1, wherein the anisotropic bulking comprises steps of: performing pressure sintering; and performing hot deformation.

11. The method of claim 10, wherein the pressure sintering is performed by performing pressurization to 50 to 1,000 MPa at a temperature of 500 to 900° C.

12. The method of claim 10, wherein the hot deformation process is carried out at a temperature of 500 to 900° C. under a pressure of 20 to 500 MPa.

13. The method of claim 10, wherein the hot deformation is selected from hot rolling, hot forging, and hot extrusion.

14. The method of claim 10, wherein the hot deformation is performed such that the strain expressed by Equation 1 below is 1 to 2:

$$\varepsilon=\ln(h_0/h) \quad \text{[Equation 1]}$$

wherein, in Equation 1, ε means a strain, $h_0$ is a height of the initial sample, and h is a height of the sample after deformation.

15. The method of claim 1, further comprising a step of performing post-heat treatment after the step of manufacturing the mixed powder into the anisotropic bulk magnet.

16. The method of claim 15, wherein the post-heat treatment is performed at a temperature of 400 to 800° C. for 10 to 600 minutes.

* * * * *